(12) United States Patent
Paul

(10) Patent No.: US 8,074,701 B2
(45) Date of Patent: Dec. 13, 2011

(54) METHOD FOR PRODUCING A PATTERN FOR THE PRECISION-CAST PREPARATION OF A COMPONENT COMPRISING AT LEAST ONE CAVITY

(75) Inventor: Uwe Paul, Ratingen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/517,889

(22) PCT Filed: Sep. 21, 2007

(86) PCT No.: PCT/EP2007/060033
§ 371 (c)(1),
(2), (4) Date: Jun. 5, 2009

(87) PCT Pub. No.: WO2008/068075
PCT Pub. Date: Jun. 12, 2008

(65) Prior Publication Data
US 2010/0294451 A1  Nov. 25, 2010

(30) Foreign Application Priority Data
Dec. 7, 2006  (EP) .................................. 06025367

(51) Int. Cl.
*B22C 9/00* (2006.01)
(52) U.S. Cl. ........................................... 164/28; 164/27
(58) Field of Classification Search ............ 164/28
See application file for complete search history.

(56) References Cited

U.S. PATENT DOCUMENTS

| | | | |
|---|---|---|---|
| 4,640,728 A | 2/1987 | Martin et al. | |
| 4,732,204 A * | 3/1988 | Tabardin | 164/35 |
| 5,465,780 A | 11/1995 | Muntner et al. | |
| 6,024,792 A | 2/2000 | Kurz et al. | |

FOREIGN PATENT DOCUMENTS

| | | |
|---|---|---|
| DE | 3211777 A1 | 10/1982 |
| DE | 10129975 A1 | 7/2002 |
| EP | 412397 B1 | 2/1991 |
| EP | 486489 B1 | 11/1994 |
| EP | 0663249 A1 | 7/1995 |
| EP | 0892090 A1 | 1/1999 |
| EP | 786017 B1 | 3/1999 |
| EP | 1306454 A1 | 5/2003 |
| EP | 1319729 A1 | 6/2003 |
| EP | 1204776 B1 | 6/2004 |
| GB | 2096525 A | 10/1982 |
| WO | WO 9967435 A1 | 12/1999 |
| WO | WO 0044949 A1 | 8/2000 |

* cited by examiner

*Primary Examiner* — Jessica L Ward
*Assistant Examiner* — Nicholas D'Aniello

(57) ABSTRACT

A method for producing a pattern for the precision-cast representation of a component having a cavity is provided. In the method wherein the component is a turbine component having a cavity, the finished pattern comprises a core and an outer contour pattern, the outer contour pattern at least partially surrounds the core and at least partially defines the outer contour of the turbine component. The core is produced from a curable core material, which cures during the course of the method, and the outer contour pattern is produced from a material which can be burned or melted out. In this case, first the outer contour pattern is produced with a cavity corresponding to the cavity of the turbine component and subsequently the curable core material is filled into the cavity and cured to produce the core.

5 Claims, 4 Drawing Sheets

METHOD FOR PRODUCING A PATTERN FOR THE PRECISION-CAST PREPARATION OF A COMPONENT COMPRISING AT LEAST ONE CAVITY

CROSS REFERENCE TO RELATED APPLICATIONS

This application is the US National Stage of International Application No. PCT/EP2007/060033, filed Sep. 21, 2007 and claims the benefit thereof. The International Application claims the benefits of European application No. 06025367.1 EP filed Dec. 7, 2006, both of the applications are incorporated by reference herein in their entirety.

FIELD OF INVENTION

The present invention relates to a method for producing a pattern for the precision-cast preparation of a component comprising at least one cavity, and to a method for producing a casting, for a component comprising at least one cavity, wherein a pattern is employed for the precision-cast preparation of the component.

BACKGROUND OF INVENTION

In the production of hollow cast components, for example turbine components, the production of the cavity is of particular importance. For example, turbine blades for gas turbines comprise a blade surface, which has a leading edge and a trailing edge. The leading and trailing edges are connected together by a wall on the suction side and a wall on the pressure side. Between the walls on the suction and pressure sides, at least one cavity is arranged which extends through a major part of the blade surface and is used to supply a coolant, for example air or steam, by which the turbine blade is cooled during operation of the turbine. The cooling effect depends on the configuration of the cavity and its accurate positioning inside the blade surface. Comparatively minor deviations in the positioning of the cavity can lead to a considerable difference in the cooling effect.

The shape and position of the cavity inside the blade surface therefore represent a challenge for the design of turbine blades. Not infrequently, a range of design modifications are required in order to optimize the placement and shape of the cavity in relation to the outer contour of the turbine blade, until the final design is established. In the development process, turbine blades with different designs are produced and tested, before the final design is established.

The production of hollow cast turbine blades for gas turbines, for example, is carried out by means of a ceramic precision casting technique. During this, a core made of a ceramic material is injected or cast in order to define the cavity. This core is subsequently placed into a mold for injecting or casting a wax pattern, and the wax is injected or cast into the mold. After the wax has cooled, the finished wax pattern together with the ceramic core form a pattern for the precision-cast preparation of the turbine blade, which in the further course of the method is employed to produce a ceramic mold for casting the turbine blade. In order to produce the ceramic mold, a ceramic shell is applied around the wax pattern. After the ceramic shell has been cured, the wax of the wax pattern is melted out so as to leave a mold for casting the hollow turbine blade. This mold comprises on the one hand the ceramic shell and on the other hand the ceramic core. Such a method is disclosed, for example, in U.S. Pat. No. 5,465,780.

Since, despite numerical aids for the simulation of flow and cooling properties, corrections of the core design have to be carried out by means of tests in the final stage of the product development, the described method of product development is relatively expensive because new casting or injection molds for the core and the wax pattern need to be produced for each design.

DE 101 29 975 A1 has therefore proposed to equip the casting or injection molds for casting the core with replaceable inserts, so that the core design can be modified without having to produce completely new casting or injection molds for the core. This procedure, however, merely allows local corrections but not overall correction of the core design. Furthermore, in the method described in DE 101 29 975 A1, corrections to the design of the outer contour of the turbine blade are not possible without producing new tools for this, for instance new casting molds.

The production of tools for manufacturing the ceramic cores and the wax patterns is elaborate and cost-intensive, as before. For example, large parts of the development time and the development costs during the production process development for hollow cast turbine blades are spent on production of the tools. Furthermore, the tools cannot be released for mass production until after the design of the hollow cast turbine component has been approved. Otherwise, modifications to the design could lead to a considerable time delay and high costs.

DE 32 11 777 A1 discloses a method for producing a metal turbine blade from two blade halves, which are metallurgically connected together.

GB 2 096 525 A likewise discloses that two metal turbine blade halves are connected together.

SUMMARY OF INVENTION

It is therefore an object of the present invention to provide an improved method for producing a pattern for the precision-cast preparation of a component comprising at least one cavity, and an improved method for producing a casting mold for a turbine component comprising at least one cavity.

The object is achieved by a method for producing a pattern for the precision-cast preparation of a component comprising at least one cavity as claimed in the claims.

In the method according to the invention for producing a pattern for the precision-cast preparation of a component comprising at least one cavity, the finished pattern comprises at least one core and an outer contour pattern which at least partially encloses the core and at least partially defines the outer contour of the component. The core is produced from a curable core material, which is cured in the course of the method. The outer contour pattern is produced from a material which can be burnt out or melted out. In the method according to the invention, the outer contour pattern is produced first with at least one cavity corresponding to the at least one cavity of the component. Subsequently, in order to produce the at least one core, the at least one cavity is filled with the curable material and the latter is cured.

In the method according to the invention, the outer contour pattern is therefore used simultaneously as a casting or injection mold for the core, so that a separate casting or injection mold does not have to be provided for the core. For the process development, the expensive production of a separate casting or injection mold for the core can therefore be avoided until the prototype production.

A resin pattern may be used as the outer contour pattern. A rapid prototype method, in particular a stereolithography process, may be employed to produce the resin pattern. In a stereolithography process, a resin which is cured when exposed to a laser is used. In order to produce the outer contour pattern, the previously fluid resin is cured layer by layer by means of a laser, until the outer contour pattern has been fully produced with its desired contour. The laser curing may in particular be carried out under computer control, so that designs already simulated in the computer can be converted relatively quickly into a pattern for the precision-cast preparation of the component.

When filling with and/or curing the curable material, the outer contour pattern may be enclosed by a stabilizing casing, a so-called setter. The stabilizing casing may also be produced by means of a rapid prototype method, for example by producing it from resin by means of a stereolithography process. In particular, it is advantageous for the casing to contain a mechanically stabilizing material, for example a metal powder. Lastly, it is also possible to produce the casing entirely from metal powder, in which case suitable rapid prototype methods, for example rapid laser sintering, may be employed in order to solidify the metal powder.

The stabilizing casing holds the outer contour pattern in shape when filling with the curable material, so that the pressure created on the outer contour pattern when filling does not cause any design modifications of the core.

In particular a material which is fluid before curing, and which is poured or injected into at least one cavity of the outer contour pattern, is suitable as a core material. Owing to their thermal stability, ceramic-based materials in particular are suitable as a core material.

The method according to the invention for producing a pattern for the precision-cast production of a component comprising at least one cavity is more variable and less expensive compared with the methods in the prior art, in which production tools, in particular casting or injection molds, need to be produced for the process development and the qualification of turbine components.

Particularly when rapid prototype methods such stereolithography processes or rapid laser sintering processes are used to produce the outer contour pattern and/or the stabilizing casing, the method according to the invention also leads more rapidly to a pattern for the precision-cast preparation of the component than the methods according to the prior art.

The expensive production tools per se can be obviated for the process development in the method according to the invention as far as the prototype production, which allows the start point of the process development to be placed substantially earlier, considerably shortens the development time and greatly reduces the risk of corrections to production tools due to design modifications. Accordingly, the overall tool costs can be reduced.

Lastly, the method according to the invention allows substantially earlier market introduction of new designs and more rapid reaction to service-driven design modifications.

In a method according to the invention for producing a casting mold or an injection mold for a component comprising at least one cavity, the method according to the invention is employed to produce a pattern for the precision-cast preparation of the component.

Other features, properties and advantages of the present invention may be found in the following description of an exemplary embodiment with reference to the appended figures.

DETAILED DESCRIPTION OF INVENTION

Figure 1:
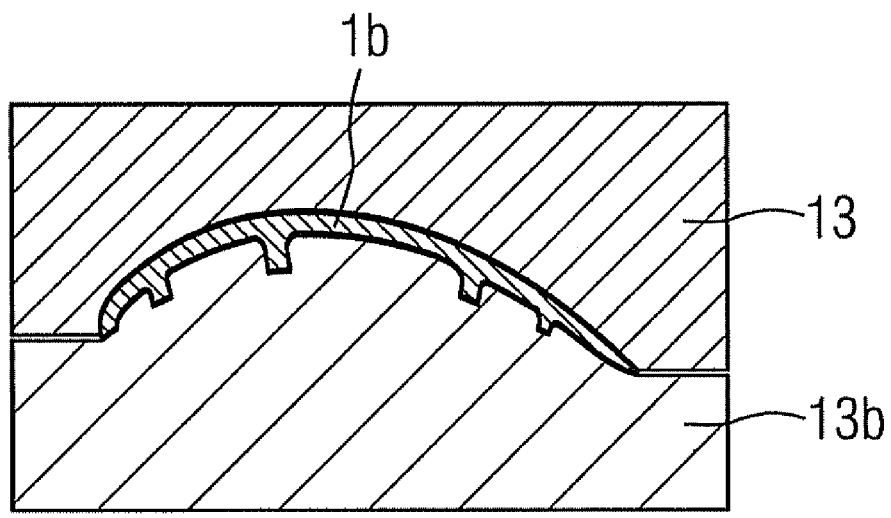
FIG. 1 shows the schematic representation of the production of an outer contour pattern in two halves.
Figure 1:
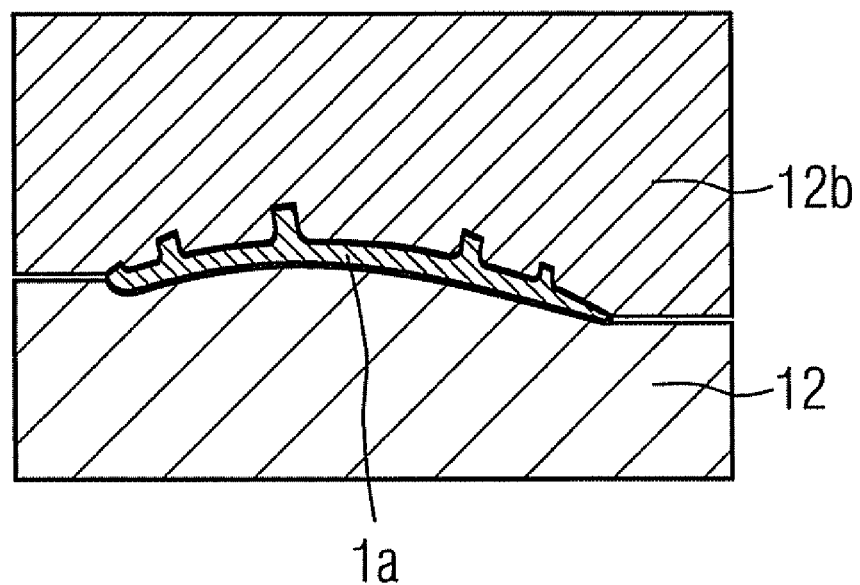

FIG. 1 shows a schematic representation of the way in which two pattern parts 1a, 1b of an outer contour pattern 1 (FIG. 2) are produced. Merely by way of example, the invention will be explained with reference to a hollow turbine blade.

The casings for the pattern parts 1a, 1b are preferably designed in two parts. For each pattern part 1a, 1b, an inner casing 12b, 13b and an outer casing 12, 13 are preferably used. The cavity which is fanned between the casings 13, 13b and respectively 12, 12b is filled, in particular by injection, with the material for the pattern parts 1a, 1b of the outer contour pattern 1, which is preferably a wax.

The inner casings 12b, 13b are then removed. In a first variant, the outer casings 12 and 13 may be removed and the two pattern parts 1a, 1b may be brought together, preferably assembled, to form an outer contour pattern 1 according to FIG. 2.

Figure 3:
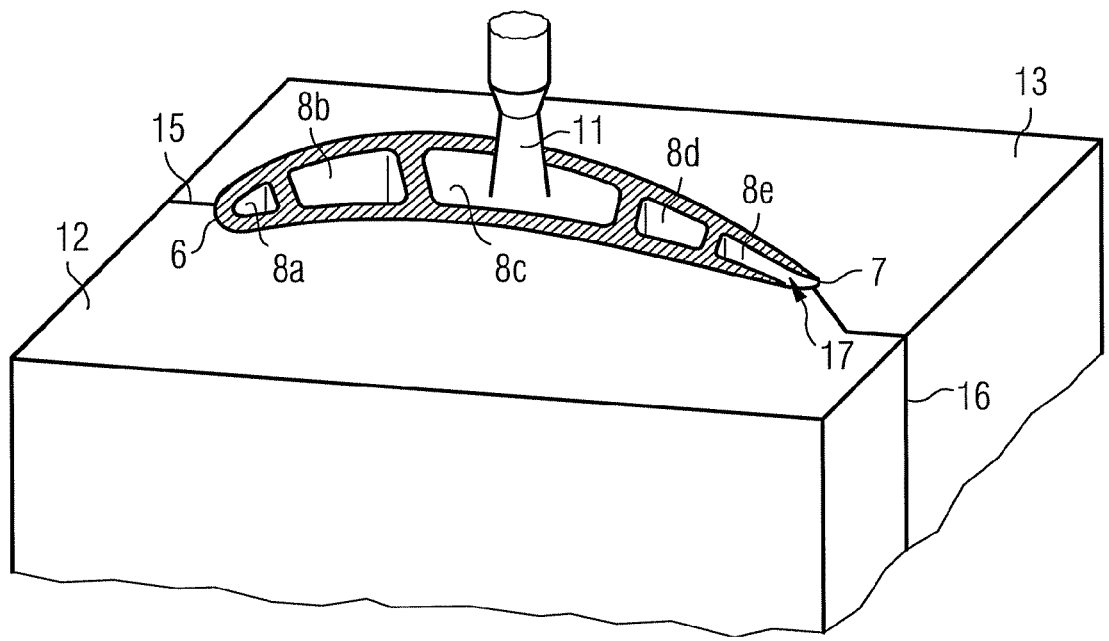
FIG. 3 shows the outer contour pattern of FIG. 1 when openings of the outer contour pattern are being filled with a curable material.

The further processing is then carried out as described in FIG. 3.

The outer casing 12, 13, which has been used for production of the pattern parts 1a, 1b of the outer contour pattern 1, may moreover also directly form the stabilizing casing 12, 13 according to FIG. 3. In this case, the pattern parts 1a, 1b need not necessarily be removed from the outer casings 12, 13 according to FIG. 1; rather the casings 12, 13 according to FIG. 1 are designed so that they can be brought together/assembled according to FIG. 3.

The inner and outer casings 12, 12b and 13, 13b, respectively, may be used several times.

For the method according to FIG. 3, the casings 12, 13 may be designed differently than in FIG. 1.

Preferably, only two pattern parts 1a, 1b are used. It is, however, also possible to use more than two pattern parts. When using two pattern parts, the component 120, 130, 155 may be divided preferably in half (50%) or preferably along a symmetry line for the contour pattern.

In FIG. 1, there is asymmetric and unequal division of the outer contour pattern 1. Preferably, the outer contour pattern 1 of the turbine blade 120, 130 to be produced is divided in the circulation flow direction.

Figure 2:
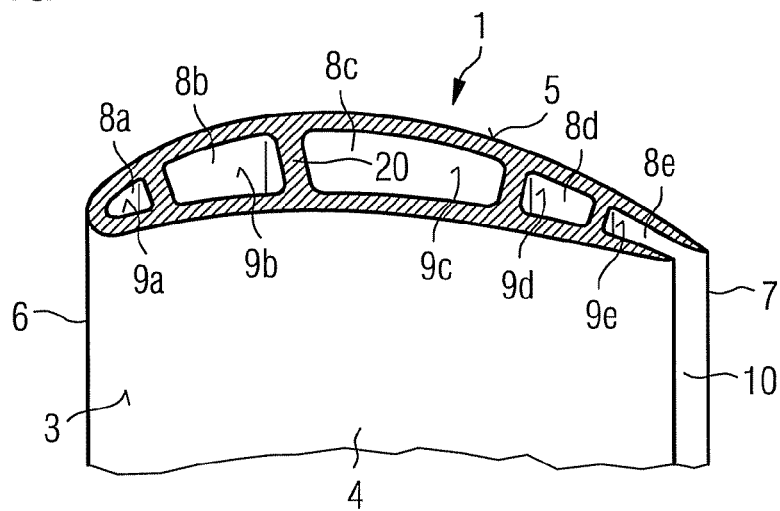
FIG. 2 shows the schematic representation of an outer contour pattern for use in the method according to the invention, in a cutaway perspective view.

FIG. 2 shows a somewhat simplified representation of a pattern 1 of a turbine blade as an exemplary embodiment of a component having a cavity, in a perspective cutaway view. The pattern 1 has an outer surface 3 which reproduces the outer contour of a turbine blade. The outer contour is divided into a contour 4 on the pressure side and a contour 5 on the suction side. The edges at which the contour 4 on the pressure side and the contour 5 on the suction side meet one another respectively form the leading edge (edge 6) and the trailing edge (edge 7) on the future turbine blade.

The pattern 1 is not solid; rather, it comprises cavities, in the present exemplary embodiment five cavities 8a to 8e which represent the future cooling air channels of the turbine blade. The inner surfaces 9a to 9e of the pattern 1, which delimit the cavities 8a to 8e, accordingly represent the inner contour of the future turbine blade. In the region of the edge 7, the fifth cavity 8e has an opening which extends parallel to the edge and represents an outlet opening for the outlet of coolant in the future turbine blade.

As explained above, the pattern 1 already represents both the outer contour and the inner contour of the future turbine blade. The pattern is made of synthetic resin, which melts or burns under the effect of temperature and is employed to produce a pattern for the precision-cast preparation of the turbine blade to be produced.

In the pattern for the precision-cast preparation of the turbine blade, the synthetic resin pattern described above merely represents a pattern for the outer contour of the turbine blade and will therefore be referred to below as an outer contour pattern 1. The preparation of the inner contour of the cavities of the turbine blade, on the other hand, is carried out with the aid of a so-called core whose outer surfaces represent the inner contour of the cavities of the turbine blade. The outer contour pattern 1, and the core which is yet to be described, together form the pattern for the precision-cast preparation of the turbine blade.

In the exemplary embodiment, the outer contour pattern 1 is produced by means of a stereolithography process. In this process a photoreactive liquid resin, held in a container, is locally exposed to laser radiation with a suitable wavelength. The exposure leads to curing of the resin at the exposed site. By suitable guiding of the laser beam, the curing of the resin can be controlled so that arbitrarily shaped structures can be produced from cured synthetic resin. Stereolithography methods are known from the prior art, and there will therefore be no further explanation here.

By means of the stereolithography process, the outer contour pattern 1 is produced from a liquid synthetic resin by managed local curing. The laser is controlled by means of a computer, so that the outer contour pattern 1 can be produced on the basis of a pure computer pattern.

After the outer contour pattern 1 has been produced, the cores defining the cavities of the future turbine blade are produced. To this end, the cavities 8a to 8e of the outer contour pattern 1 are filled with a fluid ceramic material, the so-called core compound 11. The filling may for example be carried out by casting, as represented in FIG. 3. Other filling methods are however also possible. For example, the core compound 11 may also be brushed or sprayed into the cavities.

In order to prevent deformation of the outer contour pattern 1 when filling with the core compound 11, due to the pressure thereby created, the outer contour pattern 1 is enclosed by a stabilizing casing 12, 13 before filling with the ceramic core compound 11. This stabilizing casing 12, 13 is designed in two parts. One part 12 of the stabilizing casing has a surface which is the inverse of the contour 4 of the pressure side of the outer contour pattern 1, while the other part 13 of the outer contour pattern 1 has a surface which is the inverse of the contour 5 of the suction side of the outer contour pattern 1. The stabilizing casing's surfaces which are the inverse of the outer contour 4, 5 are framed by a junction surfaces at which the two parts 12, 13 meet one another when they enclose the outer contour pattern 1 so as to stabilize it. Accordingly, the junction surfaces then lie in the region 15, 16 of the edges 6, 7 of the outer contour pattern 1.

In the region 16 of the edge 7 of the outer contour pattern 1, there is for example furthermore a widening 17 of the junction surfaces so that they do not meet one another in the immediate vicinity of the edge 7. Together with the cavity 8e, the widened region 17 forms the mold for the core which will later define the inner contour of the corresponding cavity of the turbine blade.

In the present exemplary embodiment, the stabilizing casing 12, 13 is produced in the same way as the outer contour pattern 1, by means of a stereolithography method. It is advantageous for the resin compound or synthetic resin compound cured in the stereolithography method to contain a stabilizing component, for example a metal powder. Once it has been produced, a stabilizing casing 12, 13 can be reused so long as no design modifications have been made to the outer contour of the turbine blade. In a variant of the described alternative embodiment, the stabilizing casing may also consist entirely of metal. In this case, it may for example be produced by means of rapid laser sintering from metal powder.

After all the cavities 8a to 8e of the outer contour pattern 1 have been filled with the ceramic core compound 11, the compound is cured. After the compound has been cured, the stabilizing casing 12, 13 is removed so as to leave the outer contour pattern 1 with ceramic cores contained in its cavities. Then, together with the ceramic cores, the outer contour pattern 1 forms a pattern for the precision-cast preparation of the turbine blade.

The pattern thus produced for the precision-cast preparation of the turbine blade may subsequently be used to produce a casting mold for the turbine blade. To this end the pattern is enclosed by a ceramic compound, which is subsequently cured. The ceramic compound becomes connected at selected sites to the ceramic cores contained in the outer contour pattern 1. After the ceramic compound enclosing the outer contour pattern 1 has been fully cured, the resin forming the outer contour pattern 1 is melted out or burnt out. This leaves a casting mold for casting the turbine blades. Owing to the destruction of the outer contour pattern 1 when burning or melting it out, the outer contour pattern 1 is also referred to as a lost pattern. In the casting mold, the outer contours of the ceramic cores define the inner contours of the future turbine blade and the inner contour of the ceramic mold defines the future outer contour of the turbine blade.

Owing to the direct conversion of a computer pattern into an outer contour pattern 1, which is simultaneously used as a mold for the ceramic cores, the elaborate and cost-intensive production of tools such as casting molds for manufacturing the ceramic cores and the wax patterns can be obviated. Very much more rapid conversion of a computer pattern into a pattern suitable for precision-cast preparation of the turbine blade is therefore possible. It is thereby possible to reduce the cost for producing a casting mold for a turbine blade, and to shorten the time required for this.

For better understanding of the invention, a description is given below of a typical gas turbine, a typical turbine blade and a typical combustion chamber with reference to FIGS. 4 to 6.

Figure 4:
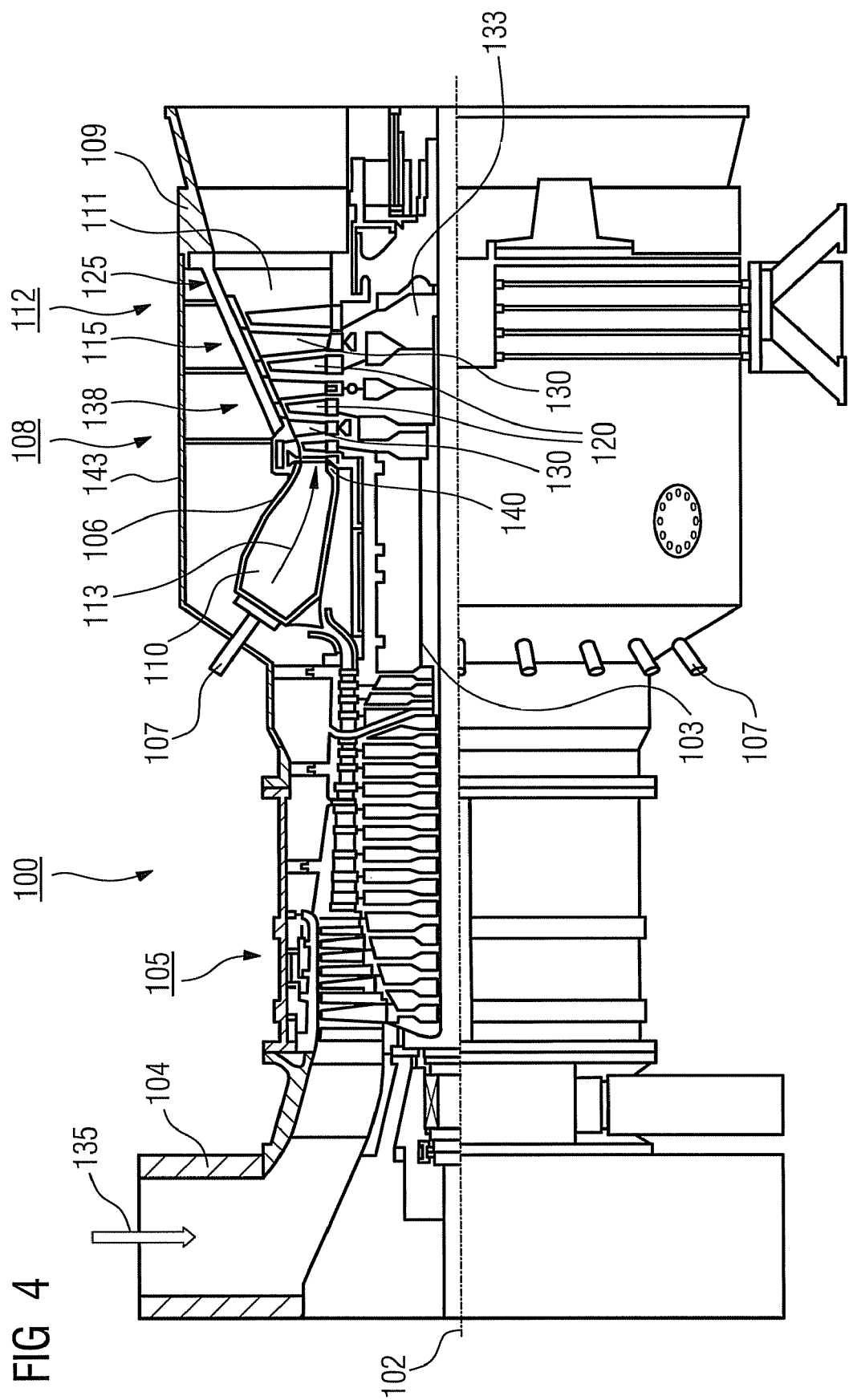
FIG. 4 shows a gas turbine by way of example in a partial longitudinal section.

FIG. 4 shows a gas turbine 100 by way of example in a partial longitudinal section. The gas turbine 100 internally comprises a rotor 103, which will also be referred to as the turbine rotor, mounted so as to rotate about a rotation axis 102. Successively along the rotor 103, there are an intake manifold 104, a compressor 105, an e.g. toroidal combustion chamber 110, in particular a ring combustion chamber 106, having a plurality of burners 107 arranged coaxially, a turbine 108 and the exhaust manifold 109.

The ring combustion chamber 110 communicates with an e.g. annular hot gas channel 111. There, for example, four successively connected turbine stages 112 form the turbine 108.

Each turbine stage 112 is formed for example by two blade rings. As seen in the flow direction of a working medium 113, a guide vane row 115 is followed in the hot gas channel 111 by a row 125 formed by rotor blades 120.

The guide vanes 130 are fastened on an inner housing 138 of a stator 143 while the rotor blades 120 of a row 125 are fastened on the rotor 103, for example by means of a turbine disk 133.

Coupled to the rotor 103, there is a generator or a work engine (not shown).

During operation of the gas turbine 100, air 135 is taken in and compressed by the compressor 105 through the intake manifold 104. The compressed air provided at the turbine-side end of the compressor 105 is delivered to the burners 107 and mixed there with a fuel. The mixture is then burnt to form the working medium 113 in the combustion chamber 110. From there, the working medium 113 flows along the hot gas channel 111 past the guide vanes 130 and the rotor blades 120. At the rotor blades 120, the working medium 113 expands by imparting momentum, so that the rotor blades 120 drive the rotor 103 and the work engine coupled to it.

During operation of the gas turbine 100, the components exposed to the hot working medium 113 become heated. Apart from the heat shield elements lining the ring combustion chamber 106, the guide vanes 130 and rotor blades 120 of the first turbine stage 112, as seen in the flow direction of the working medium 113, are heated the most.

In order to withstand the temperatures prevailing there, they may be cooled by means of a coolant.

Substrates of the components may likewise comprise a directional structure, i.e. they comprise a single crystal (SX structure) or only longitudinally directed grains (DS structure).

Iron-, nickel- or cobalt-based superalloys are for example used as material for the components, in particular for the turbine blades 120, 130 and components of the combustion chamber 110. Such superalloys are known for example from EP 1 204 776 B1, EP 1 306 454, EP 1 319 729 A1, WO 99/67435 or WO 00/44949; with respect to the chemical composition of the alloy, these documents are part of the disclosure.

The blades 120, 130 may likewise have coatings against corrosion or oxidation (MCrAlX; M is at least one element from the group iron (Fe), cobalt (Co), nickel (Ni), X is an active element and stands for yttrium (Y) and/or silicon and/or at least one rare earth element, or hafnium). Such alloys are known from EP 0 486 489 B1, EP 0 786 017 B1, EP 0 412 397 B1 or EP 1 306 454 A1, which are intended to be part of this disclosure.

On the MCrAlX, there may furthermore be a thermal barrier layer, which consists for example of $ZrO_2$, $Y_2O_3$—$ZrO_2$, i.e. it is not stabilized or is partially or fully stabilized by yttrium oxide and/or calcium oxide and/or magnesium oxide.

Rod-shaped grains are produced in the thermal barrier layer by suitable coating methods, for example electron beam deposition (EB-PVD).

The guide vanes 130 comprise a guide vane root (not shown here) facing the inner housing 138 of the turbine 108, and a guide vane head lying opposite the guide vane root. The guide vane head faces the rotor 103 and is fixed on a fastening ring 140 of the stator 143.

Figure 5:
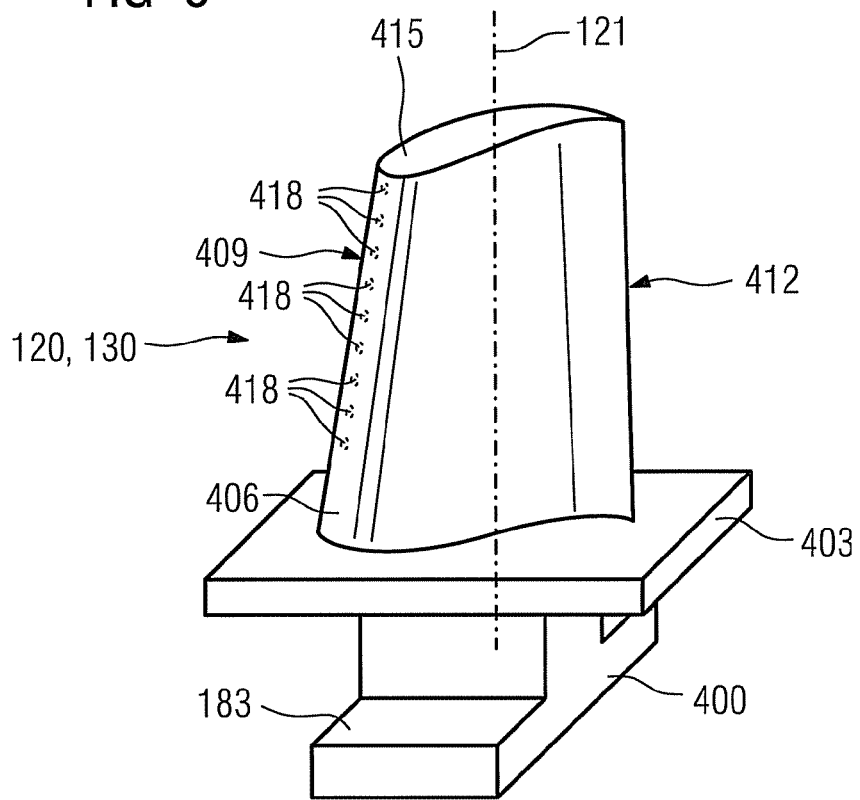
FIG. 5 shows a perspective view of a rotor blade or guide vane of a turbomachine.

FIG. 5 shows a perspective view of a rotor blade 120 or guide vane 130 of a turbomachine, which extends along a longitudinal axis 121.

The turbomachine may be a gas turbine of an aircraft or of a power plant for electricity generation, a steam turbine or a compressor.

The blade 120, 130 comprises, successively along the longitudinal axis 121, a fastening zone 400, a blade platform 403 adjacent thereto as well as a blade surface 406. As a guide vane 130, the vane 130 may have a further platform (not shown) at its vane tip 415.

A blade root 183 which is used to fasten the rotor blades 120, 130 on a shaft or a disk (not shown) is formed in the fastening zone 400.

The blade root 183 is configured, for example, as a hammerhead. Other configurations as a firtree or dovetail root are possible.

The blade 120, 130 comprises a leading edge 409 and a trailing edge 412 for a medium which flows past the blade surface 406.

In conventional blades 120, 130, for example solid metallic materials, are used in all regions 400, 403, 406 of the blade 120, 130. Such superalloys are known for example from EP 1 204 776 B1, EP 1 306 454, EP 1 319 729 A1, WO 99/67435 or WO 00/44949; these documents are part of the disclosure. The blades 120, 130 may in this case be manufactured by a casting method, also by means of directional solidification, by a forging method, by a machining method or combinations thereof.

Workpieces with a single-crystal structure or single-crystal structures are used as components for machines which are exposed to heavy mechanical, thermal and/or chemical loads during operation. Such single-crystal workpieces are manufactured, for example, by directional solidification from the melts. These are casting methods in which the liquid metal alloy is solidified to form a single-crystal structure, i.e. to form the single-crystal workpiece, or is directionally solidified. Dendritic crystals are in this case aligned along the heat flux and form either a rod crystalline grain structure (columnar, i.e. grains which extend over the entire length of the workpiece and in this case, according to general terminology usage, are referred to as directionally solidified) or a single-crystal structure, i.e. the entire workpiece consists of a single crystal. It is necessary to avoid the transition to globulitic (polycrystalline) solidification in these methods, since non-directional growth will necessarily form transverse and longitudinal grain boundaries which negate the beneficial properties of the directionally solidified or single-crystal component. When directionally solidified structures are referred to in general, this is intended to mean both single crystals which have no grain boundaries or at most small-angle grain boundaries, and also rod crystal structures which, although they do have grain boundaries extending in the longitudinal direction, do not have any transverse grain boundaries. These latter crystalline structures are also referred to as directionally solidified structures. Such methods are known from U.S. Pat. No. 6,024,792 and EP 0 892 090 A1; these documents are part of the disclosure.

The blades 120, 130 may likewise have coatings against corrosion or oxidation (MCrAlX; M is at least one element from the group iron (Fe), cobalt (Co), nickel (Ni), X is an active element and stands for yttrium (Y) and/or silicon and/or at least one rare earth element, or hafnium (HD)). Such alloys are known from EP 0 486 489 B1, EP 0 786 017 B1, EP 0 412 397 B1 or EP 1 306 454 A1, which are intended to be part of this disclosure.

On the MCrAlX, there may furthermore be a thermal barrier layer, which consists for example of $ZrO_2$, $Y_2O_3$—$ZrO_2$, i.e. it is not stabilized or is partially or fully stabilized by yttrium oxide and/or calcium oxide and/or magnesium oxide. Rod-shaped grains are produced in the thermal barrier layer by suitable coating methods, for example electron beam deposition (EB-PVD).

Refurbishment means that components 120, 130 may need to have protective layers taken off (for example by sandblasting) after their use. The corrosion and/or oxidation layers or products are then removed. Optionally, cracks in the component 120, 130 are also repaired. The component 120, 130 is then recoated and the component 120, 130 is used again.

The blade 120, 130 may be designed to be a hollow or solid. If the blade 120, 130 is intended to be cooled, it will be hollow and optionally also comprise film cooling holes 418 (indicated by dashes).

Figure 6:
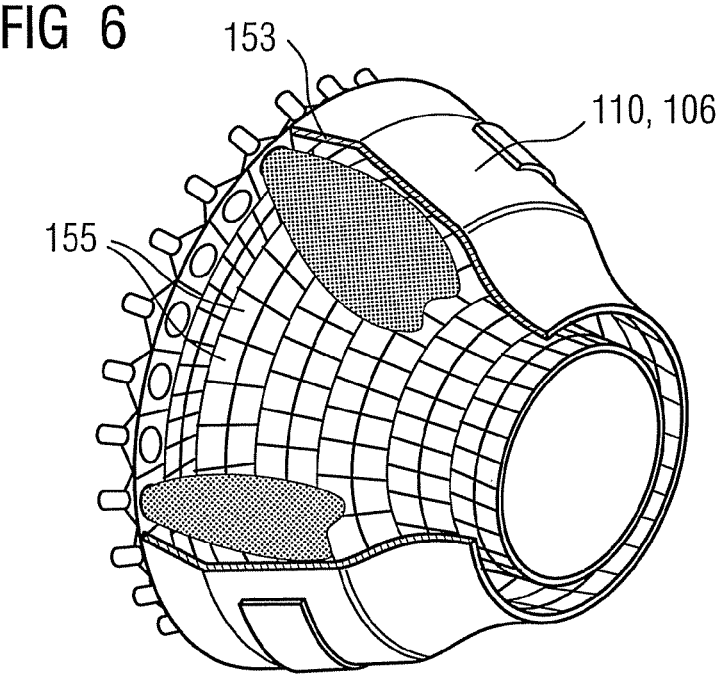
FIG. 6 shows a combustion chamber of a gas turbine system.

FIG. 6 shows a combustion chamber 110 of a gas turbine. The combustion chamber 110 is designed for example as a so-called ring combustion chamber in which a multiplicity of burners 107, which are arranged in the circumferential direction around a rotation axis 102, open into a common combustion chamber space. To this end, the combustion chamber 110 as a whole is designed as an annular structure which is positioned around the rotation axis 102.

In order to achieve a comparatively high efficiency, the combustion chamber 110 is designed for a relatively high temperature of the working medium M, i.e. about 1000° C. to 1600° C. In order to permit a comparatively long operating time even under these operating parameters which are unfavorable for the materials, the combustion chamber wall 153 is provided with an inner lining formed by heat shield elements 155 on its side facing the working medium M.

Each heat shield element 155 made of an alloy is equipped with a particularly heat-resistant protective layer on the working medium side, or is made of refractory material. These may be solid ceramic blocks or alloys with MCrAlX and/or ceramic coatings. The materials of the combustion chamber wall and its coatings may be similar to the turbine blades.

Owing to the high temperatures inside the combustion chamber 110, a cooling system may also be provided for the heat shield elements 155 or for their retaining elements.

The combustion chamber 110 is in particular configured for detecting losses of the heat shield elements 155. To this end, a number of temperature sensors 158 are positioned between the combustion chamber wall 153 and the heat shield elements 155.

The invention claimed is:

1. A method for producing an outer contour pattern of a hollow component, comprising:
   producing the outer contour pattern in at least two pattern parts, a first pattern part and a second pattern part;
   producing the first pattern part of the outer contour pattern in a first inner casing and a first outer casing;
   producing the second pattern part of the outer contour pattern in a second inner casing and a second outer casing;
   removing the first inner casing and the second inner casing; and
   assembling the first outer casing and the second outer casing with the first pattern part and the second pattern part still attached to their respective outer casings wherein the assembling step forms a cavity defined in part by each of the outer contour pattern, the inner contour pattern, the first outer casing, and the second outer casing.

2. The method as claimed in claim 1, wherein the hollow component is a turbine component.

3. The method as claimed in claim 1, wherein only two pattern parts are used.

4. The method as claimed in claim 1, wherein the first inner casing, the first outer casing, the second inner casing, and the second outer casing are reused to make an additional outer contour pattern.

5. The method as claimed in claim 1, wherein the first outer casing and the second outer casing have cooperating geometries when assembled.

* * * * *